United States Patent [19]

Germanetti

[11] Patent Number: 5,321,631
[45] Date of Patent: Jun. 14, 1994

[54] METHOD AND SELF-CONTAINED SYSTEM FOR HARMONIZING EQUIPMENTS ON BOARD A VEHICLE, USING MEANS OF MEASURING THE EARTH'S GRAVITATIONAL AND MAGNETIC FIELDS

[75] Inventor: Serge A. Germanetti, Marseille, France

[73] Assignee: Societe Nationale Industrielle et Aerospatiale, Paris, France

[21] Appl. No.: 841,384

[22] Filed: Feb. 25, 1992

[30] Foreign Application Priority Data

Mar. 7, 1991 [FR] France ................... 91 02722

[51] Int. Cl.$^5$ ............................................. G01C 21/00
[52] U.S. Cl. ................................ 364/559; 364/454; 364/571.02; 33/356
[58] Field of Search ........... 364/453, 454, 559, 571.01, 364/571.02, 434; 33/356; 324/244, 245, 246, 247

[56] References Cited

U.S. PATENT DOCUMENTS

| | | | |
|---|---|---|---|
| 3,803,387 | 4/1974 | Lackowski | 235/61.5 |
| 4,134,681 | 1/1979 | Elmer | 356/152 |
| 4,845,856 | 7/1989 | Rochette | 33/228 |
| 4,930,085 | 5/1990 | Kleinschmidt | 364/449 |
| 5,001,647 | 3/1991 | Rapiejko | 364/453 |
| 5,050,087 | 9/1991 | Walrath et al. | 364/453 |
| 5,150,856 | 9/1992 | Gaide | 244/3.2 |
| 5,172,323 | 12/1992 | Schmidt | 364/453 |

FOREIGN PATENT DOCUMENTS 0383043 8/1990 European Pat. Off. .
1236806 3/1967 Fed. Rep. of Germany .
1128516 9/1968 United Kingdom .

Primary Examiner—Thomas G. Black
Assistant Examiner—Michael Zanelli
Attorney, Agent, or Firm—Marshall, O'Toole, Gerstein, Murray & Borun

[57] ABSTRACT

A method for harmonizing an equipment relative to a vehicle, such as a helicopter, based upon sensing of gravitational and magnetic fields in a number of reference systems. The equipment is installed fixedly on board the vehicle which, relative to a first absolute reference system (RM), has an orientation defined by a second reference system (R2) tied to the vehicle. The equipment is subjected to the earth's gravitational field represented by a gravity vector $\bar{g}$ oriented along its gradient, as well as to the earth's magnetic field represented by a vector $\bar{H}$ oriented along its gradient. The orientation of the equipment is defined, relative to the first absolute reference system (RM), by a third reference system (R3). The equipment includes a device for measuring the components of the gravity vector $\bar{g}$, fixed to the equipment (2), and the vehicle carries a computer; a memory associated with the computer; an equipment magnetometer, fixed to the vehicle, whose orientation, relative to the first absolute reference system (RM), is referenced by a fourth reference system (R4); and a link connecting the equipment and the equipment magnetometer to the computer and to the memory. The gravitational and magnetic fields are measured when the vehicle is in a number of different orientations, and the equipment is harmonized to the vehicle based thereon.

13 Claims, 3 Drawing Sheets

METHOD AND SELF-CONTAINED SYSTEM FOR HARMONIZING EQUIPMENTS ON BOARD A VEHICLE, USING MEANS OF MEASURING THE EARTH'S GRAVITATIONAL AND MAGNETIC FIELDS

BACKGROUND OF THE INVENTION

The present invention relates to a method, and a system employing same, enabling one or more equipments set up on board a vehicle to be harmonized in a self-contained manner. In particular, and in a non-limiting manner, the invention applies to aircraft.

It is known that certain equipments loaded on board a vehicle must have a fixed orientation relative to the latter; this is the case in particular for inertial navigation instruments, detection instruments and armaments systems. The collection of these equipments must operate using common reference axes, which requires an initial setting of each of their reference axes. To do this, a reference trihedral is defined for the vehicle, which serves as basis of reference for the orientation of reference trihedrals relating to the various equipments. Such a setting operation is called harmonization or alignment.

Various procedures are known for carrying out this operation.

A first procedure consists in mounting the equipment to be harmonized on a rack comprising a fixed part, integral with the vehicle, and an adjustable part integral with the equipment, the position of this equipment being referenced by optical sighting and modified by reference to another optical measurement appertaining to an already harmonized reference system. This procedure customarily serves for the harmonization of the inertial modules mounted on board aircraft.

Such a procedure is fairly tricky to implement since it requires sighting means external to the vehicle, and, furthermore, it necessitates being able optically to access the equipments to be harmonized, this being a significant constraint in the choice of their location.

This procedure determines the harmonization error angles for each equipment and requires them to be corrected later by a mechanical rotation. By virtue of this, it is lengthy and tricky to implement.

Another procedure consists in using fitment planes produced with the desired accuracy and harmonized. This requires accurately positioning an appliance relative to the vehicle and later making it carry out an accurate machining of the fitment plane, which is thus harmonized. This fitment plane later receives two accurately machined centering pins on which the equipment will be mounted.

This procedure, which uses successive transfers of accuracy of mechanical positioning, is awkward to implement. In particular, it requires as many fitment planes as there are equipments to be installed, and the latter must also have available accurately machined fixing means, this raising the cost.

A more sophisticated procedure, following French Patent 2 610 101, consists in arranging the equipment in a fixed rack and in determining the harmonization error by comparing between an appliance, serving as reference to define the axes of the vehicle, and another appliance temporarily substituted for the equipment to be harmonized. The harmonization error, which is stored in the memory of a computer of the vehicle, serves subsequently for the latter to correct, through calculation, the values output by the equipment. The latter must clearly have an accurate fixing device which is a copy of that of the appliance which has been substituted.

This procedure thus avoids mechanical adjustments, but requires, however, a reproducibility of the fixing means, as well as measurements by optical sighting.

For its part, the U.S. Pat. No. 4,134,681 describes a harmonization procedure using two laser beams, the orientation of each of which is detected by two equipments which define the components of these beams in their characteristic trihedral. A computer receives these data and has available sufficient equations to determine the three angles of error between these two equipments. Since one of these equipments is already harmonized, the calculated error in angle is thus the harmonization error of the other equipment.

Such a procedure thus avoids a mechanical adjustment since the computer will be capable of correcting, through calculation, the data provided by the equipment which is not mechanically harmonized. However, it requires optical measurements and therefore imposes constraints as regards the positioning of the equipments.

SUMMARY OF THE INVENTION

The aim of the present invention is to remedy these various disadvantages and permit the harmonization of equipments on board a vehicle supplied with a computer receiving the data output by the various equipments having to be harmonized, in particular an aircraft.

To this end, the method according to the invention, for harmonizing an equipment relative to a vehicle, said equipment being installed fixedly on board said vehicle which, relative to a first absolute reference system RM, has an orientation well defined by a second reference system R2 tied to said vehicle, said equipment being subjected to the earth's gravitational field represented by a gravity vector $\vec{g}$ oriented along its gradient, as well as to the earth's magnetic field represented by a vector $\vec{H}$ oriented along its gradient, and the orientation of said equipment being defined, relative to said first absolute reference system RM, by a third reference system R3, this equipment comprising a device for measuring the components of said gravity vector $\vec{g}$, fixed to said equipment (2); and said vehicle carrying:

a computer;

a memory associated with said computer;

an equipment magnetometer, fixed to said vehicle, whose orientation, relative to said first absolute reference system RM, is referenced by a fourth reference system R4; and a first link connecting said equipment and the equipment magnetometer to said computer and to said memory, is noteworthy in that it comprises the first series of following steps:

there is disposed, fixedly on board the vehicle, an appliance, also referred to as a gravity-sensing apparatus, harmonized relative to the latter, comparable to said equipment, as well as a utility magnetometer harmonized relative to said gravity-sensing apparatus, said gravity-sensing apparatus and said utility magnetometer being connected to said computer and to said memory by a second link;

the vehicle is placed in a first fixed position relative to the ground, corresponding to a first positioning R21 of said second reference system R2 relative to said first absolute reference system there are measured, with the gravity-sensing apparatus, the values of the components of a vector $\bar{g}1$, representing the earth's gravitational field $\bar{g}$ sensed by the appliance in the second reference system R2, and said values are transformed into reference gravitational data indicative of said values measured by the gravity-sensing apparatus;

there are measured, with said utility magnetometer, the values of the components of a vector $\bar{H}1$, representing the earth's magnetic field $\bar{H}$ sensed by this utility magnetometer in the second reference system R2, and said values are transformed into reference magnetic data indicative of said values measured by the utility magnetometer;

said reference gravitational data, indicative of said values measured by the gravity-sensing apparatus, as well as said reference magnetic data, indicative of said values measured by the utility magnetometer, are transmitted to the memory, via said second link connecting the gravity-sensing apparatus to said memory, and stored therein;

with said equipment, are measured the values of the components of a vector $\bar{g}2$, representing the earth's gravitational field $\bar{g}$ sensed by said equipment in the third reference system R3, and said values are transformed into measured gravitational data indicative of said values measured by said equipment;

with said equipment magnetometer, are measured the values of the components of a vector $\bar{H}2$, representing the earth's magnetic field $\bar{H}$ sensed by this equipment magnetometer in the fourth reference system R4, and said values are transformed into measured magnetic data indicative of said values measured by the equipment magnetometer;

said measured gravitational data indicative of said values measured by said equipment, as well as said measured magnetic data, indicative of said values measured by the equipment magnetometer, are transmitted to the memory via said first link, and stored therein;

in the computer, from said reference gravitational data, said reference magnetic data, said measured gravitational data, and said measured magnetic data, a first rotation operator R1 ($\alpha$, $\beta$, $\Gamma$) is calculated, correcting, at least for the most part, the angular errors of harmonization between the second reference system R2 of said vehicle and the third reference system R3 of said equipment according to the relationships:

$$\alpha = \Phi 1 - \Phi 2$$

$$\beta = \theta 1 - \theta 2$$

$$\Gamma = \Omega 1 - \Omega 2 - 0$$

$\Phi 1$, $\theta 1$ and $\Omega 1$ being respectively the angle of roll, the angle of pitch attitude and the angle of heading of the vehicle, which are determined by the computer from said reference gravitational data and from said reference magnetic data, and $\Phi 2$, $\theta 2$, and $\Omega 2$ being respectively the angle of roll, the angle of pitch attitude and the angle of heading of the equipment, which are determined by the computer from said measured gravitational data and from said measured magnetic data;

the first rotation operator R1 ($\alpha$, $\beta$, $\Gamma$) is stored and is incorporated in the computer which applies it to the angles $\Phi 2$, $\theta 2$, $\Omega 2$ determined subsequently from subsequent measurements, giving subsequent measured gravitational data indicative of subsequent values measured by said equipment, as well as subsequent measured magnetic data indicative of subsequent values measured by the equipment magnetometer.

The harmonization error for the equipment can thus be determined with a high accuracy, without the need to access it optically.

Similarly, in order to determine the harmonization error for the equipment, it is possible to carry out a second series of steps comprising the following steps:

there is arranged, fixedly on board the vehicle, a gravity-sensing apparatus harmonized relative to the latter, comparable to said equipment, as well as a utility magnetometer harmonized relative to said gravity-sensing apparatus, said gravity-sensing apparatus and said utility magnetometer being connected to said computer and to said memory by a second link;

the vehicle is placed in a first fixed position relative to the ground, corresponding to a first positioning R21 of said second reference system R2 relative to said first absolute reference system RM;

there are measured, with the gravity-sensing apparatus 8, the values of the components of a vector $\bar{g}1$, representing the earth's gravitational field $\bar{g}$ sensed by the gravity-sensing apparatus in the second reference system R2, and said values are transformed into reference gravitational data indicative of said values measured by the gravity-sensing apparatus;

there are measured, with said utility magnetometer, the values of the components of a vector $\bar{H}1$, representing the earth's magnetic field $\bar{H}$ sensed by this utility magnetometer in the second reference system R2, and said values are transformed into reference magnetic data indicative of said values measured by the utility magnetometer;

said reference gravitational data, indicative of said values measured by the gravity-sensing apparatus, as well as said reference magnetic data, indicative of said values measured by the utility magnetometer, are transmitted to the memory, via said second link connecting the gravity-sensing apparatus to said memory, and stored therein;

with said equipment, are measured the values of the components of a vector $\bar{g}2$, representing the earth's gravitational field $\bar{g}$ sensed by said equipment in the third reference system R3, and said values are transformed into measured gravitational data indicative of said values measured by said equipment;

with said equipment magnetometer, are measured the values of the components of a vector $\bar{H}2$, representing the earth's magnetic field $\bar{H}$ sensed by this equipment magnetometer in the fourth reference system R4, and said values are transformned into measured magnetic data indicative of said values measured by the equipment magnetometer;

said measured gravitational data indicative of said values measured by said equipment, as well as said measured magnetic data, indicative of said values measured by the equipment magnetometer, are transmitted to the memory via said first link, and stored therein;

in the computer, from said reference gravitational data, said reference magnetic data, said measured gravitational data, and said measured magnetic data, a first rotation operator R1 ($\alpha$, $\beta$, $\Gamma$) is calculated, correcting, at least for the most part, the angular errors of harmonization between the second reference system R2 of said vehicle and the third reference system R3 of said equipment according to the relationship:

$$\left|\begin{array}{c}\vec{g}1\\ \vec{H}1\end{array}\right|=\left|\begin{array}{cc}R1(\alpha,\beta,\Gamma) & 0\\ 0 & R1(\alpha,\beta,\Gamma)\end{array}\right|\times\left|\begin{array}{c}\vec{g}2\\ \vec{H}2\end{array}\right|$$

the first rotation operator R1 ($\alpha$, $\beta$, $\Gamma$) is stored and is incorporated in the computer which applies it to angles $\Phi2$, $\theta2$, $\Omega2$ determined subsequently from subsequent measurements, giving subsequent measured gravitational data indicative of subsequent values measured by said equipment, as well as subsequent measured magnetic data indicative of subsequent values measured by the equipment magnetometer.

the angles $\Phi1$, $\theta1$, $\Omega1$, on the one hand, and the angles $\Phi2$, $\theta2$, $\Omega2$, on the other hand, $\Phi1$, $\theta1$, $\Omega1$ being respectively the angle of roll, the angle of pitch attitude and the angle of heading of the vehicle, which are determined by the computer from said reference grativational data and from said reference magnetic data, and $\Phi2$, $\theta2$ and $\Omega2$ being respectively the angle of roll, the angle of pitch attitude and the angle of heading of the equipment, which are determined by the computer from said measured gravitational data and from said measured magnetic data, are stored.

Thus, without optical sighting, the harmonization corrections to be made to the equipment are determined.

Said corrections are further improved by following said first or second series of steps with a third series of steps comprising the following steps:

the vehicle is set into non-rectilinear motion;

a plurality of values of the components of the magnetic field $\vec{H}2$ sensed by the equipment magnetometer according to the fourth reference system R4, with differing orientations of the vehicle, are measured at various instants and stored in the memory;

in the computer, from said plurality of values of the components of the magnetic field $\vec{H}2$ sensed by the equipment magnetometer and measured in the preceding step, a corrective operator OC is calculated defining the corrections to be applied to the components of the various magnetic field vectors $\vec{H}2$ measured in all the preceding steps by the equipment magnetometer, in order to correct the hard iron and soft iron magnetic pertubations and the orientation error between the third reference system R3 of said equipment 2 and the fourth reference system R4 of said equipment magnetometer;

by application of said corrective operator OC, the components of the various magnetic field vectors $\vec{H}2$ measured in all the preceding steps by the equipment magnetometer, are transformed into corrected magnetic field vector components $\vec{H}2c$, replacing, for the subsequent calculations, the components of the corresponding magnetic field vectors $\vec{H}2$;

in the computer, from said reference gravitational data, said reference magnetic data, said measured gravitational data, and said measured magnetic data, corresponding to the measurements made on the ground, and for which the components of the magnetic field vector $\vec{H}2$ representing the magnetic field sensed by said equipment magnetometer are replaced by the components of the corrected magnetic vector $\vec{H}2c$, the error angles $\alpha$, $\beta$, $\Gamma$ are calculated defining a second rotation operator R2 ($\alpha$, $\beta$, $\Gamma$), instead of said first rotation operator R1 ($\alpha$, $\beta$, $\Gamma$), between the second reference system R2 of said vehicle and the third reference system R3 of said equipment, the angles $\alpha$, $\beta$, $\Gamma$ being solutions of the system of equations:

$$\left|\begin{array}{c}\vec{g}1\\ \vec{H}1\end{array}\right|=\left|\begin{array}{cc}R2(\alpha,\beta,\Gamma) & 0\\ 0 & R2(\alpha,\beta,\Gamma)\end{array}\right|\times\left|\begin{array}{c}\vec{g}2\\ \vec{H}2c\end{array}\right|$$

the second rotation operator R2 ($\alpha$, $\beta$, $\Gamma$) is stored and is incorporated in the computer which applies it to the angles $\Phi2$, $\theta2$, $\Omega2$ determined subsequently from subsequent measurements, giving subsequent measured gravitational data indicative of subsequent values measured by said equipment, as well as subsequent measured magnetic data indicative of subsequent values measured by the equipment magnetometer.

In this way, the remaining harmonization error can be further reduced and can be rid of the perturbing magnetic fields and of the harmonization error of the equipment magnetometer.

In particular the method can offer the feature of having said reference gravitational data and said reference magnetic data, on the one hand, said measured gravitational data and said measured magnetic data, on the other hand, corresponding to the measurements made on the ground, and which are respectively representative of the angles $\Phi1$, $\theta1$, $\Omega1$, on the one hand, and $\Phi2$, $\theta2$, $\Omega2$, on the other hand.

Thus, the values of the various angles are directly available for the subsequent calculations.

Furthermore, the method applied to a plurality of M (M: positive integer) equipments to be harmonized, each having first and second rotation operators R1 ($\alpha i$, $\beta i$, $\Gamma i$) and R2 ($\alpha i$, $\beta i$, $\Gamma i$) as well as a characteristic corrective operator (OCi) (with i=1 to M), is noteworthy in that the plurality of first and second rotation operators R1 ($\alpha i$, $\beta i$, $\Gamma i$), R2 ($\alpha i$, $\beta i$, $\Gamma i$) and of correctice operators OCi is determined simultaneously, from measurements made by the various equipments and equipment magnetometers and by a gravity-sensing apparatus and a utility magnetometer.

It is thus possible, through a single series of steps, to harmonize a plurality of equipments, and hence without increasing the time required.

Furthermore, certain equipments may comprise communications interfaces, this affording greater flexibility in respect of the harmonization.

Moreover, the method permits the use of a single memory.

All the data are thus grouped together and are more easily accessible.

Similarly, the method requires only a single computer.

Thus, this computer can process all the data, without having to performexchanges with other computers, this enabling the calculations to be performed more rapidly.

Moreover, the method offers the attraction of being able to be combined with the following steps:

with the equipment, data relating to supplementary orientations of the vehicle on the ground are measured;

said data relating to said supplementary orientations of the vehicle on the ground are transmitted to the computer via the first link;

in the computer, a third rotation operator R3 ($\alpha$, $\beta$, $\Gamma$) is calculated, used, instead of said second rotation operator R2 ($\alpha$, $\beta$, $\Gamma$), to correct the errors of harmonization of the equipment(s).

It is thus possible to further improve the accuracy of the harmonization correction.

Moreover, the method according to the invention permits the use of a gravity-sensing apparatus which consists of the instrument of the type of the equipment of highest performance.

Thus are available reference values having the best accuracy possible.

The method according to the invention permits the use; moreover, of data output by the gravity-sensing apparatus or by at least one equipment, and relating to the speed and/or the acceleration of said vehicle (1).

Furthermore, the system according to the invention, for harmonizing an equipment, installed fixedly on board a vehicle relative to said vehicle which, relative to a first absolute reference system RM, has an orientation defined by a second reference system R2 tied to said vehicle, said equipment being subjected to the earth's gravitational field represented by a gravity vector $\bar{g}$ oriented along its gradient, as well as to the earth's magnetic field represented by a vector $\bar{H}$ oriented along its gradient, and the orientation of said equipment being defined, relative to said first absolute reference system RM, by a third reference system R3, is noteworthy in that this equipment comprises a device for measuring the components of said gravity vector $\bar{g}$, fixed to said equipment; and in that said vehicle carries:

an equipment magnetometer, fixed to said vehicle, whose orientation, relative to said first absolute reference system RM, is referenced by a fourth reference system R4;

a computer;

a memory associated with said computer; and a first link connecting said equipment and the equipment magnetometer to said computer and to said memory.

The system offers the attraction of being self-contained and of being expandable in terms of the number of equipments to be harmonized.

Moreover, the system according to the invention can comprise at least one gravity-sensing apparatus or at least one equipment providing, moreover, data relating to the speed and/or the acceleration of said vehicle.

These data enable the accuracy of the measurements to be refined continuously.

The figures of the attached drawing will make it clearly understood how the invention can be embodied. In these figures, identical references designate identical or similar elements.

DETAILED DESCRIPTION OF A PREFERRED EMBODIMENT

Figure 1:
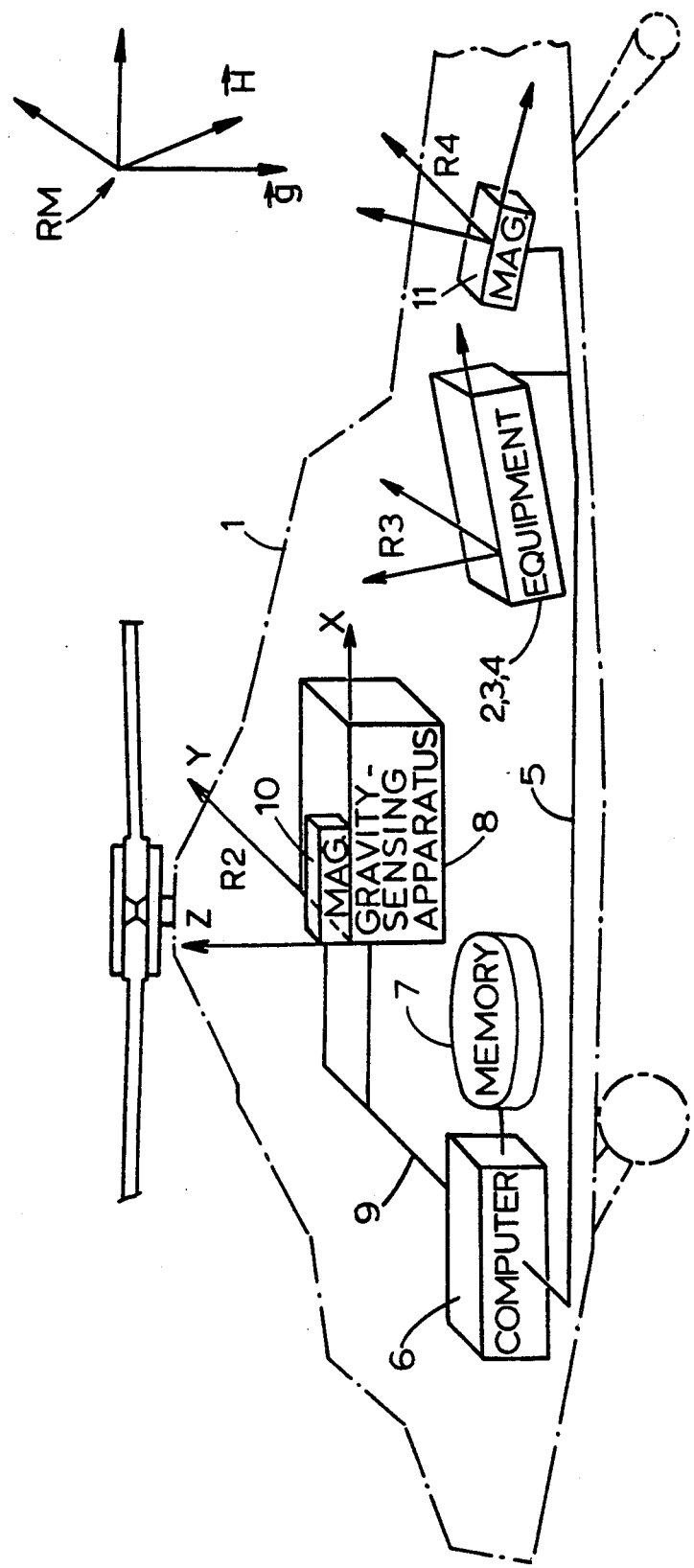
FIG. 1 represents diagrammatically a vehicle in which is set up an equipment to be harmonized.

A vehicle 1 is represented diagrammatically in FIG. 1, in the form of a helicopter, in which is set up an equipment 2 having to be harmonized in relation to this helicopter. This equipment 2 comprises a device for measuring the components of the gradient of gravitational field, which defines the vertical, in the form of an accelerometer unit 3 or a gyrometer unit 4, or both. A first link 5 connects the equipment 2 to a computer 6 and to an associated memory 7. Furthermore, an already harmonized appliance 8, comprising an equipment comparable to the equipment 2, is also set up in the vehicle 1. A second link 9 enables the appliance 8 to be connected to the memory 7 through the computer 6. Moreover, a utility magnetometer 10, itself also harmonized, is set up rigidly in the vehicle 1, and is connected by the second link 9 to the memory 7 whereas an unharmonized equipment magnetometer 11 is also set up rigidly in the vehicle 1 and is connected to the memory 7 by the first link 5.

The equipment 2 and the appliance 8 can measure, in an orientation reference system which is characteristic to each and tied fixedly to it, the components of an oriented physical quantity of locally constant amplitude, represented by a vector, such as the vector $\bar{g}$ oriented along the gradient of the earth's gravitational field, and which defines the vertical. Each of the magnetometers is able to measure, in an orientation reference system which is characteristic to each and tied fixedly to it, the components of an oriented magnetic physical quantity of locally constant amplitute, represented by a vector, such as the vector $\bar{H}$ oriented along the gradient of the earth's magnetic field.

The orientation of the reference systems is defined in the following way. A first absolute reference system RM is defined, serving as absolute orientation reference for other reference systems. A second reference system R2 is tied fixedly to the vehicle 1 and defines the orientation of the latter relative to the first absolute reference system RM. A third reference system R3 is tied fixedly to the equipment 2 and defines the orientation of the latter relative to the first absolute reference system RM. A fourth reference system R4 is tied fixedly to the equipment magnetometer 11 and defines the orientation of the latter relative to the first absolute reference system RM. Preferably, these reference systems consist of tri-orthogonal trihedrals.

The two reference systems R2 and R3 exhibit a harmonization error which can be represented by a rotation operator $R(\alpha, \beta, \Gamma)$ defined from the Euler angles making it possible to go from one reference system to the other, as explained below. This rotation operator $R(\alpha, \beta, \Gamma)$ constitutes an operator representing the harmonization error of the equipment 2, and which, by applying it to the components of the vector which are measured by this equipment 2, makes it possible to calculate corresponding values of components of this vector which are not marred by the harmonization error.

Figure 2:
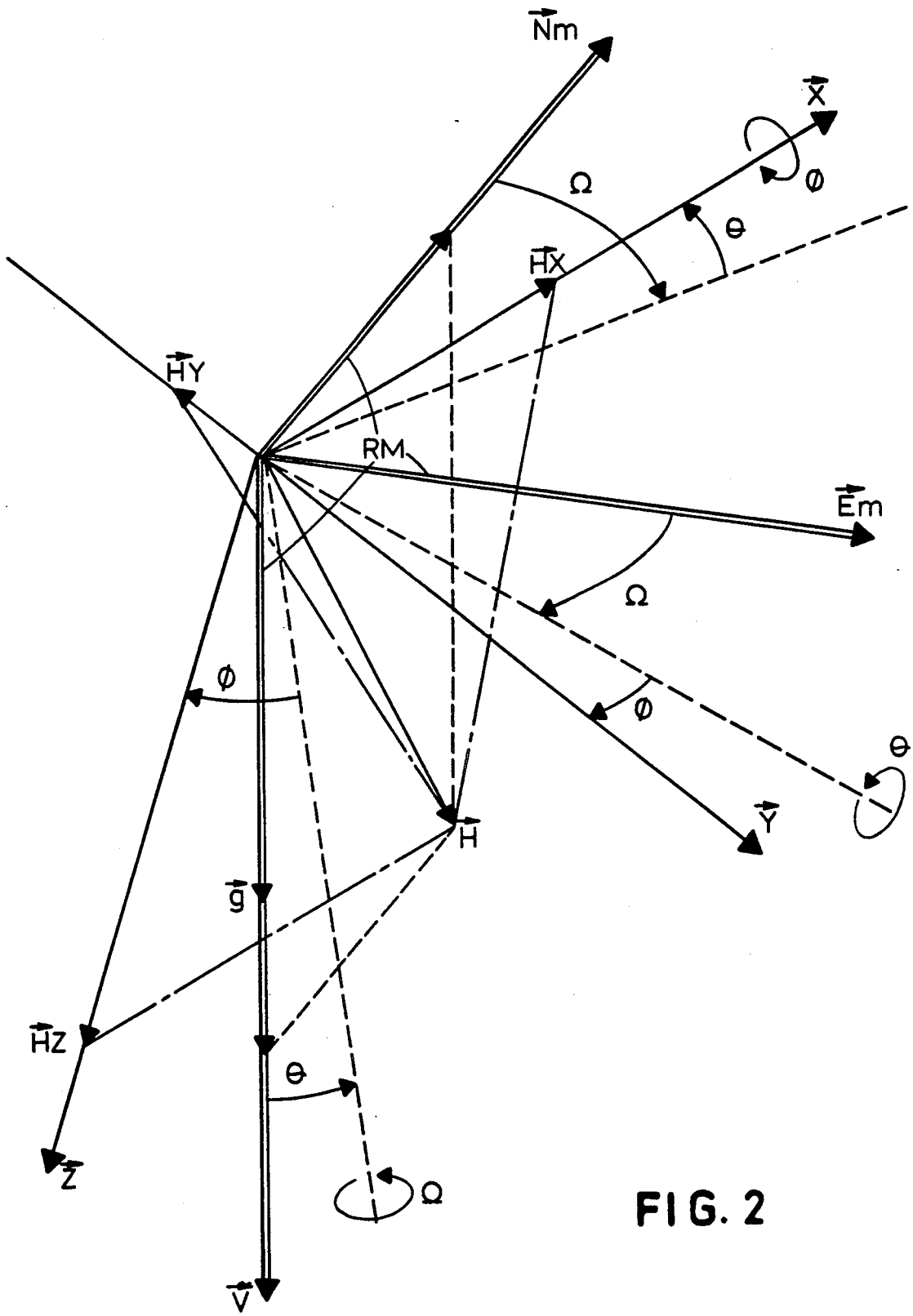
FIG. 2 represents orientation reference systems enabling the various instruments to be referenced.

As FIG. 2 shows, by using the direction of the local magnetic field $\bar{H}$ and of the gradient of the earth's gravity $\bar{g}$, it is possible to define the absolute reference system RM consisting, for example, of axes defining a local tri-orthogonal trihedral formed by an axis $\bar{V}$ parallel to the gradient of the earth's gravitational field and oriented towards the center of the Earth, and giving the local vertical, by a horizontal axis $\bar{N}m$, giving magnetic north, and by a third axis $\bar{E}m$ giving magnetic east. The gradient of the gravitational field, represented by the vector $\bar{g}$, is colinear with the axis $\bar{V}$, whereas the local magnetic field, represented by a vector $\bar{H}$, is contained in the plane defined by the axes $\bar{V}$ and $\bar{N}m$, and therefore has a component along both these axes $\bar{V}$ and $\bar{N}m$ respectively.

If a second trihedral of axes $\bar{X}\bar{Y}\bar{Z}$ is defined, representing the second reference system of the vehicle 1, and in which the measurements of the three components $\bar{H}X$, $\bar{H}Y$, $\bar{H}Z$ of this same vector $\bar{H}$ are made, to go from one to the other of these reference trihedrals RM and $\bar{X}\bar{Y}\bar{Z}$ requires three successive rotations defined by Euler angles defined as:

Ω: magnetic angle of heading
θ: angle of pitch attitude
Φ: angle of roll

These three rotations can be written according to the conventional matrix for the Euler angles:

$$R(\Phi, \theta, \Omega) = \begin{vmatrix} \cos\Omega\cos\theta & \cos\Omega\sin\theta\sin\Phi - \sin\Omega\cos\Phi & \sin\Omega\sin\Phi + \cos\Omega\sin\theta\cos\Phi \\ \sin\Omega\cos\theta & \cos\Omega\cos\Phi + \sin\Omega\sin\theta\sin\Phi & \sin\Omega\sin\theta\cos\Phi - \cos\Omega\sin\Phi \\ -\sin\theta & \cos\theta\sin\Phi & \cos\theta\cos\Phi \end{vmatrix}$$

The first absolute reference system RM can then serve as local reference for each of the abovementioned instruments, that is to say the equipment 2, the appliance 8, the utility magnetometer 10 and the equipment magnetometer 11. The equipment 2 and the appliance 8 are able to measure the components of the gradient vector of gravity, whereas the utility magnetometer 10 and the equipment magnetometer 11 can measure the components of the magnetic field vector in the axes of their own reference system, the existence of deviations between the measurements of the three components of the same vector by two similar instruments evidencing an error of orientation between their reference systems. Thus, the components measured along the axes of the reference system of the relevant instrument can be expressed through simple trigonometric relationships, from the amplitude of this vector and from the angle which it makes with each of the axes, thereby enabling this angle to be determined. If the components of this same vector, when they are measured in the trihedral of the other instrument, which performs the same type of measurement, are not identical, it suffices to rotate the reference trihedral of the latter until equality is obtained in the homologous components in the two trihedrals, this being done in the form of a mathematical correction simulating the effect of a physical rotation of the reference trihedrals. However, sufficient equations must be available to be able to determine the value of the angles reflecting the orientation error of the third reference system R3 of the equipment 2 to be harmonized relative to the second reference system R2 of the vehicle 1, this being explained below.

In order to establish a communication between the appliance 8 and the equipment 2 to be harmonized, the latter includes an input enabling it to receive from outside the absolute references with which it is to be harmonized.

Harmonization is performed in a fixed position, the vehicle 1 having landed in accordance with angles Φ1, θ1, Ω1 which are known in the first absolute reference system RM, and are measured by the appliance 8 which includes an inertial module at least as accurate as that to be harmonized, and the utility magnetometer 10. As indicated earlier, the appliance 8 is previously harmonized by means, for example, of one of the procedures indicated initially, which thus provides the reference Φ1, θ1, Ω1 of the orientation of the vehicle 1. The utility magnetometer 10, like the second reference system of the vehicle 1, has an oriented reference system; it is therefore also defined by the angles Φ1, θ1, Ω1 in the first absolute reference system RM.

This leads on to starting a first sequence of following steps:

there are measured, with the appliance 8, the values of the components of a vector g1, representing the earth's gravitational field g sensed by the appliance 8 in the second reference system R2, and said values are transformed into reference gravitational data indicative of said values measured by the appliance 8;

there are measured, with said utility magnetometer 10, the values of the components of a vector $\vec{H}1$, representing the earth's magnetic field $\vec{H}$ sensed by this utility magnetometer 10 in the second reference system R2, and said values are transformed into reference magnetic data indicative of said values measured by the utility magnetometer 10;

said reference gravitational data, indicative of said values measured by the appliance 8, as well as said reference magnetic data, indicative of said values measured by the utility magnetometer 10, are transmitted to the memory 7, via said second link 9 connecting the appliance 8 to said memory 7, and stored therein.

Simultaneously, the measurements Φ2 and θ2 of the equipment 2, as well as the components of the magnetic field $\vec{H}2$ of the equipment magnetometer 11 associated with this equipment 2, and the measured angle of heading Ω2, are stored.

This leads on to following the steps of said first sequence, with the following steps:

with the equipment 2, are measured the values of the components of a vector $\vec{g}2$, representing the earth's gravitational field $\vec{g}$ sensed by the equipment 2 in the third reference system R3, and said values are transformed into measured gravitational data indicative of said values measured by the equipment 2;

with said equipment magnetometer 11, are measured the values of the components of a vector $\vec{H}2$, representing the earth's magnetic field $\vec{H}$ sensed by this equipment magnetometer 11 in the fourth reference system R4, and said values are transformed into measured magnetic data indicative of said values measured by the equipment magnetometer 11;

said measured gravitational data indicative of said values measured by the equipment 2, as well as said measured magnetic data, indicative of said values measured by the equipment magnetometer 11, are transmitted to the memory 7 via said first link 5, and stored therein.

The magnetic field vector $\vec{H}$ can be expressed as a function of the magnetic field vector $\vec{H}1$ sensed by the utility magnetometer 10:

$$\vec{H} = R(\Phi1, \theta1, \Omega1) \times \vec{H}1$$

the rotation operator $R(\Phi1, \theta1, \Omega1)$ rotating the second reference system R2 so as to make it coincide with the first absolute reference system RM.

This magnetic field $\vec{H}$ differs slightly from the field $\vec{H}$ owing to the presence of magnetic pertubations created by the vehicle 1, and which will be explained further on.

As concerns the measurements relating to gravity, the vector $\vec{g}$, expressing the gradient of the gravity field, is, similarly, such that:

$$\vec{g} = R(\Phi1, \theta1, \Omega1) \times \vec{g}1$$

which, in the first absolute reference system RM, can be expressed in the form:

$$\begin{vmatrix} 0 \\ 0 \\ g \end{vmatrix} = g \times R(\Phi 1, \theta 1, \Omega 1) \times \begin{vmatrix} -\sin\theta 1 \\ \sin\Phi 1 \cos\theta 1 \\ \cos\Phi 1 \cos\theta 1 \end{vmatrix}$$

the components of $\vec{g}1$ being those of the earth's gravity vector, which are measured by the appliance 8. Since the equipment 2 is assumed to have a harmonization error defined by the rotation operator $R(\alpha, \beta, \Gamma)$ between the axes of its reference system R3 and the corresponding axes of the reference system R2 of the vehicle 1, the vectors $\vec{g}1$ and $\vec{g}2$ are related by the rotation operator $R(\alpha, \beta, \Gamma)$ in such a way that:

$$\vec{g}1 = R(\alpha,\beta,\Gamma) \times \vec{g}2$$

or, expressed through their components:

$$\begin{vmatrix} -\sin\theta 1 \\ \sin\Phi 1 \cos\theta 1 \\ \cos\Phi 1 \cos\theta 1 \end{vmatrix} = R(\alpha, \beta, \Gamma) \times \begin{vmatrix} -\sin\theta 2 \\ \sin\Phi 2 \cos\theta 2 \\ \cos\Phi 2 \cos\theta 2 \end{vmatrix}$$

The above relationship is applicable whatever the heading of the appliance module 8: the angles $\Phi 1$ and $\theta 1$ are therefore always independent of the angle $\Omega 1$. For the same reason, $\phi 2$ and $\theta 2$ are not related to the angle $\Omega 2$, which is anyway incorrect since the magnetic field $\vec{H}2$ has not been corrected of the pertubations indicated earlier, nor of the harmonization error of the equipment magnetometer 11. Consequently, the angle $\Gamma$, or heading error of the equipment 2 relative to the vehicle 1, cannot be obtained through the above relationship, equivalent to two equations with three unknowns.

A first minimizing of the heading error can however be undertaken using the raw results from the previous measurements.

Two solutions are possible to eliminate the major errors in the angles $\alpha, \beta, \Gamma$ and make possible a first flight under acceptable conditions, the appliance 8 and the utility magnetometer 10 being removed:

the first solution consists in presu/ning that the equipment magnetometer 11 has no heading harmonization error (error of from 1 to 2 degrees, for example), whence:

$$\alpha = \Phi 1 - \Phi 2 + \Sigma 1$$

$$\beta = \theta 1 - \theta 2 + \Sigma 2$$

$\Sigma 1$ and $\Sigma 2$ being infinitesimals if the angles of pitch attitude and of roll are small: it is therefore presumed that, for this approximation, $\Sigma 1$ and $\Sigma 2$ are zero.

the second amounts to neglecting the effects of the magnetic perturbations and of the harmonization error of the equipment magnetometer 11 on the field $\vec{H}2$, in which case $\alpha, \beta, \Gamma$ are deduced from the following equations:

$$\begin{vmatrix} \vec{g} \\ \vec{H} \end{vmatrix} = \begin{vmatrix} R & 0 \\ 0 & R \end{vmatrix} \times \begin{vmatrix} \vec{g}2 \\ \vec{H}2 \end{vmatrix}$$

a relationship in which $\vec{g}$ and $\vec{H}$ designate respectively the gradient of the gravitational field and gradient of the absolute magnetic field, which are deduced from the initial measurements made with the appliance 8 and the utility magnetometer 10 and the equipment 2 and the equipment magnetometer 11, and $R1(\alpha,\beta,\Gamma)$ designates a first rotation operator whose value is close to that of the rotation operator $R(\alpha,\beta,\Gamma)$.

With just one position of the vehicle 1, the above equation is equivalent to a system of three equations with three unknowns, which it is also possible to write:

$$\begin{vmatrix} \vec{g}1 \\ \vec{H}1 \end{vmatrix} = \begin{vmatrix} R1(\alpha, \beta, \Gamma) & 0 \\ 0 & R1(\alpha, \beta, \Gamma) \end{vmatrix} \times \begin{vmatrix} \vec{g}2 \\ \vec{H}2 \end{vmatrix}$$

which expresses implicitly the conservation of the angles between the vectors $\vec{g}$ and $\vec{H}$ in the reference systems R2, R3 and R4, resulting in one less independent equation.

The first rotation operator $R1(\alpha,\beta,\Gamma)$ is then stored and is incorporated in the computer 6 which applies it to the angles $\Phi 2, \theta 2, \Omega 2$ which are determined subsequently from subsequent measurements, giving subsequent measured gravitational data, indicative of subsequent values measured by the equipment 2, as well as subsequent measured magnetic data indicative of subsequent values measured by the equipment magnetometer 11.

Furthermore, it is advisable to correct the effect of magnetic perturbations corrupting the measurements provided by the equipment magnetometer 11. This is done by means of autocompensation and overcompensation procedures which will be explained.

The magnetic perturbations which occur are essentially:

the hard iron perturbations: effects of the residual magnetizations in the ferromagnetic materials and their fields, created by the direct currents. They are modelled by a vector $\vec{b}$.

the soft iron perturbations: effects of the deformations of the magnetic field lines, due to the inhomogeneity of the magnetic permeability of the vehicle 1. They are modelled by a matrix $|K|^{-1}$.

The following expression results from this:

$$\vec{H}2 = |K|^{-1} \times \vec{H}2c + \vec{b}$$

where $\vec{H}2$ and $\vec{H}2c$ designate respectively the vector of the magnetic field measured by the equipment magnetometer 11 and the corrected magnetic vector deduced therefrom.

If the vector $\vec{H}2c$ is considered relative to the moving vehicle 1, in accordance with the three angles defining its orientation, the local geometric location of the extremity of $\vec{H}2c$ is theoretically a sphere centered at the origin of the vector $\vec{H}2c$. The perturbations described above transform this sphere into an ellipsoid and translate its center relative to that of the sphere.

The objective of the autocompensation and overcompensation corrections made, in general, during flights under turning configuration and at various angles of pitch attitude and of roll of the vehicle, is to refer each point of the ellipse to the theoretical sphere, that is to say to carry out the operation:

$$\vec{H}2c|K|(\vec{H}2 - \vec{b})$$

To do this, during autocompensation and overcompensation flights, a database is established associating the measured components of $\vec{H}2$ and the items of information Φ and θ, from the equipment 2 and from the equipment magnetometer 11. After this, there are sufficient relationships available between these measurements in order to determine the shape of the ellipsoid defined by the extremity of the vector $\bar{H}2$, which enables the center thereof to be defined and, through this, its offset relative to its theoretical position, which defines the vector $\bar{b}$. Next, the ellipsoid is transformed, by calculation, into a sphere whose radius has the sought amplitude of the corrected magnetic field $\bar{H}2c$, this being manifested in the matrix $|K|$ which enables the components of the corrected magnetic vector $\bar{H}2c$ to be obtained from the measured magnetic vector $\bar{H}2$. The accuracy of the calculations is clearly all the better the more measurements there are.

It should be noted that the above correction also corrects the harmonization error of the equipment magnetometer 11, since the abovementioned perturbations have an effect which cannot be discerned from that of the harmonization error.

Thus, the method can be supplemented with a second series of steps, comprising the following steps:

the vehicle 1 is set into non-rectilinear motion;

a plurality of values of the components of the magnetic field $\bar{H}2$ sensed by the equipment magnetometer 11 according to the fourth reference system R4, with differing orientations of the vehicle 1, are measured at various instants and stored in the computer 7;

in the computer 6, from said plurality of values of the components of the magnetic field $\bar{H}2$ sensed by the equipment magnetometer 11 and measured in the preceding step, a corrective operator OC is calculated defining the corrections to be applied to the components of the various magnetic field vectors $\bar{H}2$ measured in all the preceding steps by the equipment magnetometer 11, in order to correct the hard iron and soft iron magnetic perturbations and the orientation error between the third reference system R3 of said equipment 2 and the fourth reference system R4 of said equipment magnetometer 11;

by application of said corrective operator OC, the components of the various magnetic field vectors $\bar{H}2$ measured in all the preceding steps by the equipment magnetometer 11, are transformed into corrected magnetic field vector components $\bar{H}ac$, replacing, for the subsequent calculations, the components of the corresponding magnetic field vectors $\bar{H}2$;

in the computer 6, from said reference gravitational data, said reference magnetic data, said measured gravitational data, and said measured magnetic data, corresponding to the measurements made on the ground, and for which the components of the magnetic field vector $\bar{H}2$ representing the magnetic field sensed by said equipment magnetometer 11 are replaced by the components of the corrected magnetic vector $\bar{H}2c$, the error angles $\alpha, \beta, \Gamma$ are calculated defining a second rotation operator R2 $(\alpha, \beta, \Gamma)$ between the second reference system R2 of said vehicle 1 and the third reference system R3 of said equipment 2, the angles $\alpha, \beta, \Gamma$ being solutions of the system of equations:

$$\begin{vmatrix} \vec{g}_1 \\ \vec{H}_1 \end{vmatrix} = \begin{vmatrix} R2(\alpha, \beta, \Gamma) & 0 \\ 0 & R2(\alpha, \beta, \Gamma) \end{vmatrix} \times \begin{vmatrix} \vec{g}_2 \\ \vec{H}_{2c} \end{vmatrix}$$

the second rotation operator R2 $(\alpha, \beta, \Gamma)$ is stored and is incorporated in the computer 6 which applies it to the angles Φ2, θ2, Ω2 determined subsequently from subsequent measurements, giving subsequent measured gravitational data indicative of subsequent values measured by the equipment 2, as well as subsequent measured magnetic data indicative of subsequent values measured by the equipment magnetometer 11.

These operations have only to be done once, except of course following a displacement of the equipment 2. In the event of a modification of the magnetic environment (taking on or releasing of metal bodies), the error angles $\alpha, \beta, \Gamma$ stay unchanged, but the autocompensation and overcompensation procedure has to be redone so as to recalculate the corresponding corrections.

Having calculated the rotation operator R2 $(\alpha,\beta,\Gamma)$, the latter will be incorporated at the level of the whole of the navigation installation, so as to correct the measurements provided by the module of the quantities $\alpha, \beta, \Gamma$. Consequently, after obtaining of the first or second rotation operator R1$(\alpha,\beta,\Gamma)$ or R2$(\alpha,\beta,\Gamma)$, the result of the method is to make virtually equal, or equal, the measurements of the angles Φ,θ,Ω in the second reference system R2 of the vehicle 1 and in the third reference system R3 of the equipment 2.

Figure 3:
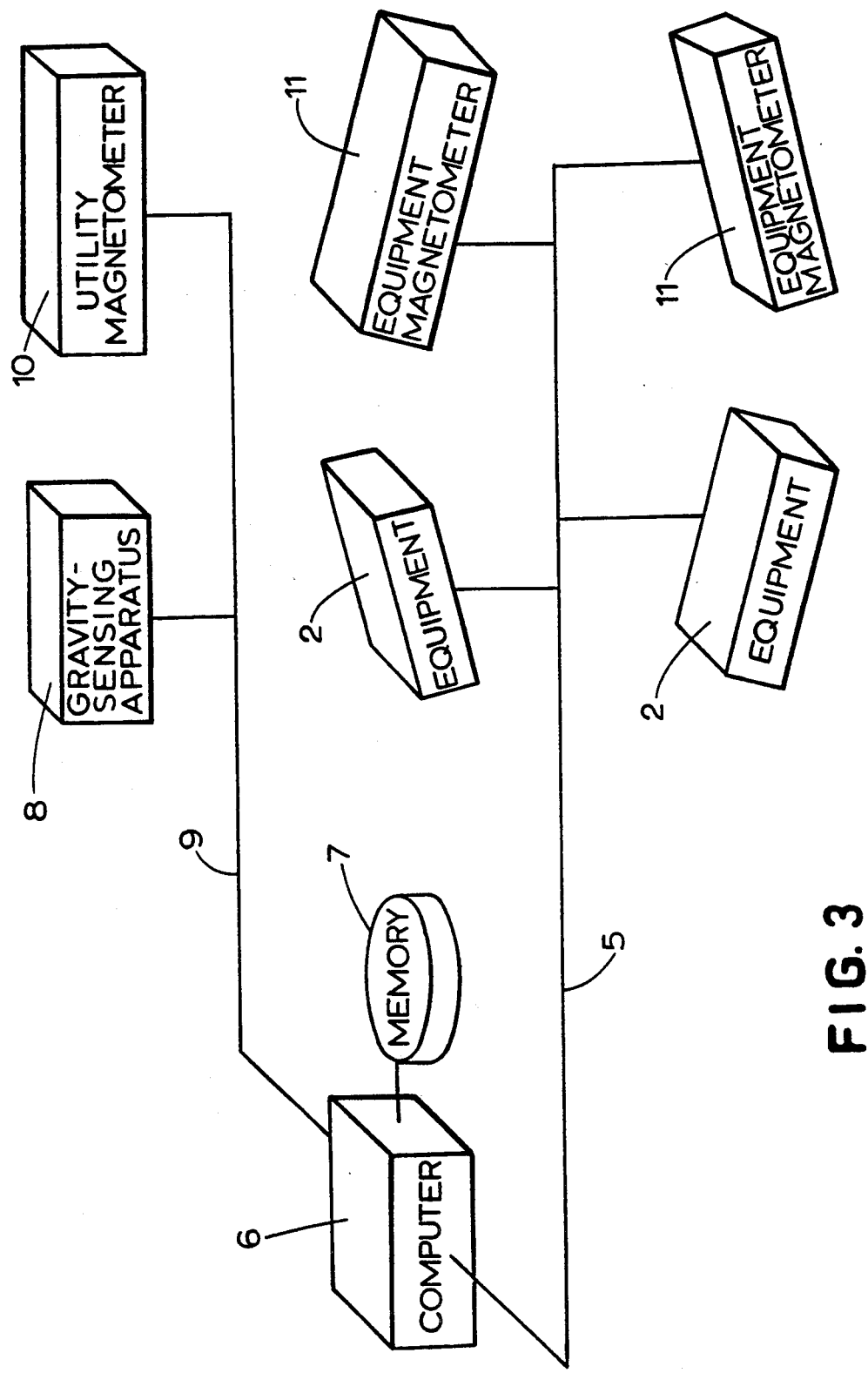
FIG. 3 illustrates the generalization of this harmonization method to the case of a plurality of M (M: positive integer) equipments to be harmonized.

FIG. 3 illustrates the generalization of this harmonization method to the case of a plurality of M (M: positive integer) equipments 2 to be harmonized, each having first and second rotation operators R1$(\alpha i,\beta i,\Gamma i)$ and R2$(\alpha i,\beta i,\Gamma i)$ as well as a characteristic corrective operator OCi (with i=1 to N). Indeed, in this case it is possible to perform simultaneously the operations described earlier and to calculate simultaneously the plurality of first and second rotation operators R1$(\alpha i,\beta i,\Gamma i)$, R2$(\alpha i,\beta i,\Gamma i)$ and of corrective operators OCi, from measurements made by the various equipments 2 and equipment magnetometers 11 and by a single appliance 8 and a single utility magnetometer 10.

Use can be made of several equipment magnetometers 11 or just one, in which case the uncertainty of harmonization between them disappears.

Furthermore, certain equipments 2 may comprise communications interfaces, this affording greater flexibility in respect of the harmonization.

In particular, use can be made of outputs from the equipment 2 of highest performance, for example, outputs relating to the speed and/or the acceleration of the vehicle 1, in order to improve the uniformity of the measurements of the other equipments 2 and specify the rotations of these latter relative to the reference appliance 8, or indeed relative to said equipment 2 of highest performance, previously harmonized, and which is used instead of said reference appliance 8.

Moreover, the method can be improved by carrying out the following steps on the ground:

with the equipment 2, the equipment magnetometer 11, the appliance 8 and the utility magnetometer 10, data are measured relating to the supplementary ground orientations of the vehicle 1, supplementing the homologous data relating to the initial orientation;

said data relating to the orientations of the vehicle 1 on the ground and to the orientations of vehicle 1 in flight, the latter data enabling the measurements of the magnetic field to be corrected, as explained earlier, are transmitted to the computer 6;

in the computer 6, a third rotation operator R3$(\alpha,\beta,\Gamma)$ is calculated, used, instead of the second rotation operator R2$(\alpha,\beta,\Gamma)$, to correct the errors of harmonization of the equipment(s) 2.

This therefore makes it possible to continue to incorporate measurement results in such a way as to reduce the influence of the error of each measurement.

We claim:

1. A method for harmonizing an equipment (2) relative to a vehicle (1), said equipment (2) being installed fixedly on board said vehicle (1) which, relative to a first absolute reference system (RM), has an orientation defined by a second reference system (R2) tied to said vehicle (1), said equipment (2) being subjected to the earth's gravitational field represented by a gravity vector $\vec{g}$ oriented along its gradient, as well as to the earth's magnetic field represented by a vector $\vec{H}$ oriented along its gradient, and the orientation of said equipment (2) being defined, relative to said first absolute reference system (RM), by a third reference system (R3), this equipment (2) comprising a device (3,4) for measuring the components of said gravity vector $\vec{g}$, fixed to said equipment (2); and said vehicle (1) carrying a computer (6); a memory (7) associated with said computer (6); an equipment magnetometer (11), fixed to said vehicle (1), whose orientation, relative to said first absolute reference system (RM), is referenced by a fourth reference system (R4); and a first link (5) connecting said equipment (2) and the equipment magnetometer (11) to said computer (6) and to said memory (7), said method comprising the following steps:

disposing, fixedly on board the vehicle (1), a gravity-sensing apparatus (8) harmonized relative to the vehicle and a utility magnetometer (10) harmonized relative to said gravity-sensing apparatus (8), said gravity-sensing apparatus (8) and said utility magnetometer (10) being connected to said computer (6) and to said memory (7) by a second link (9);

placing the vehicle (1) in a first fixed position relative to the ground, corresponding to a first positioning (R21) of said second reference system (R2) relative to said first absolute reference system (RM);

measuring, with the gravity-sensing apparatus (8), the values of the components of a vector $\vec{g}1$, representing the earth's gravitational field $\vec{g}$ sensed by the gravity-sensing apparatus (8) in the second reference system (R2), and transforming said values into reference gravitational data indicative of said values measured by the gravity-sensing apparatus (8);

measuring, with said utility magnetometer (10), the values of the components of a vector $\vec{H}1$, representing the earth's magnetic field $\vec{H}$ sensed by said utility magnetometer (10) in the second reference system (R2), and transforming said values into reference magnetic data indicative of said values measured by the utility magnetometer (10);

transmitting to the memory (7) via the second link (9) and storing in the memory (7) said reference gravitational data, indicative of said values measured by the gravity-sensing apparatus (8), as well as said reference magnetic data, indicative of said values measured by the utility magnetometer (10);

measuring, with said equipment (2), the values of the components of a vector $\vec{g}2$, representing the earth's gravitational field $\vec{g}$ sensed by said equipment (2) in the third reference system (R3), and transforming said values into measured gravitational data indicative of said values measured by equipment (2);

measuring, with said equipment magnetometer (11), the values of the components of a vector $\vec{H}2$, representing the earth's magnetic field $\vec{H}$ sensed by said equipment magnetometer (11) in the fourth reference system (R4), and transforming said values into measured magnetic data indicative of said values measured by the equipment magnetometer (11);

transmitting to the memory (7) via said first link (5) and storing in the memory (7), said measured gravitational data indicative of said values measured by said equipment (2), as well as said measured magnetic data, indicative of said values measured by the equipment magnetometer (11);

calculating a first rotation operator R1($\alpha$, $\beta$, $\Gamma$), in the computer (6), from said reference gravitational data, said reference magnetic data, said measured gravitational data, and said measured magnetic data to correct the angular errors of harmonization between the second reference system (R2) of said vehicle (1) and the third reference system (R3) of said equipment (2) according to the relationships:

$$\alpha = \Phi_1 - \Phi_2$$

$$\beta = \theta_1 - \theta_2$$

$$\Gamma = \Omega_1 - \Omega_2 = 0$$

$\phi_1$, $\theta_1$ and $\Omega_1$ being respectively the angle of roll, the angle of pitch attitude and the angle of heading of the vehicle (1), which are determined by the computer (6) from said reference gravitational data and from said reference magnetic data, and $\phi_2$, $\theta_2$, and $\Omega_2$ being respectively the angle of roll, the angle of pitch attitude and the angle of heading of the equipment (2), which are determined by the computer (6) from said measured gravitational data and from said measured magnetic data;

storing in the computer (6) the first rotation operator R1 ($\alpha$, $\beta$, $\Gamma$); and applying said first rotation operator R1 ($\alpha$, $\beta$, $\Gamma$) to angles $\phi_2$, $\theta_2$, and $\Omega_2$ determined subsequently from subsequent measurements to give subsequent measured gravitational data indicative of subsequent values measured by said equipment (2), as well as subsequent measured magnetic data indicative of subsequent values measured by the equipment magnetometer (11).

2. A method for harmonizing an equipment (2) relative to a vehicle (1), said equipment (2) being installed fixedly on board said vehicle (1) which, relative to a first absolute reference system (RM), has an orientation defined by a second reference system (R2) tied to said vehicle (1), said equipment (2) being subjected to the earth's gravitation field represented by a gravity vector $\vec{g}$ oriented along its gradient, as well as to the earth's magnetic field represented by a vector $\vec{H}$ oriented along its gradient, and the orientation of said equipment (2) being defined, relative to said first absolute reference system (RM), by a third reference system (R3), this equipment (2) comprising a device (3,4) for measuring the components of said gravity vector $\vec{g}$, fixed to said equipment (2); and said vehicle (1) carrying a computer (6); a memory (7) associated with said computer (6); an equipment magnetometer (11), fixed to said vehicle (1), whose orientation, relative to said first absolute reference system (RM), is referenced by a fourth reference system (R4); and a first link (5) connecting said equipment (2) and the equipment magnetometer (11) to said computer (6) and to said memory (7), said method comprising the following steps:

disposing, fixedly on board the vehicle (1), a gravity-sensing apparatus (8) harmonized relative to the vehicle and a utility magnetometer (10) harmonized relative to said gravity-sensing apparatus (8), said gravity-sensing apparatus (8) and said utility magnetometer (10) being connected to said computer (6) and to said memory (7) by a second link (9);

placing the vehicle (1) in a first fixed position relative to the ground, corresponding to a first positioning (R21) of said second reference system (R2) relative to said first absolute reference system (RM);

measuring, with the gravity-sensing apparatus (8), the values of the components of a vector $\bar{g}1$, representing the earth's gravitational field $\bar{g}$ sensed by the gravity-sensing apparatus (8) in the second reference system (R2), and transforming said values into reference gravitational data indicative of said values measured by the gravity-sensing apparatus (8);

measuring, with said utility magnetometer (10), the values of the components of a vector $\bar{H}1$, representing the earth's magnetic field $\bar{H}$ sensed by said utility magnetometer (10) in the second reference system (R2), and transforming said values into reference magnetic data indicative of said values measured by the utility magnetometer (10);

storing in the memory (7) said reference gravitational data, indicative of said values measured by the gravity-sensing apparatus (8), as well as said reference magnetic data, indicative of said values measured by the utility magnetometer (10);

measuring, with said equipment (2), the values of the components of a vector $\bar{g}2$, representing the earth's gravitational field $\bar{g}$ sensed by said equipment (2) in the third reference system (R3), and transforming said values into measured gravitational data indicative of said values measured by said equipment (2);

measuring with said equipment magnetometer (11), the values of the components of a vector $\bar{H}2$, representing the earth's magnetic field $\bar{H}$ sensed by said equipment magnetometer (11) in the fourth reference system (R4), and transforming said values into measured magnetic data indicative of said values measured by the equipment magnetometer (11);

storing in the memory (7) said measured gravitational data indicative of said values measured by said equipment (2), as well as said measured magnetic data, indicative of said values measured by the equipment magnetometer (11);

calculating a first rotation operator R1 ($\alpha$, $\beta$, $\Gamma$) in the computer (6), from said reference gravitatinal data, said reference magnetic data, said measured gravitational data, and said measured magnetic data to correct the angular errors of harmonization between the second reference system (R2) of said vehicle (1) and the third reference system (R3) of said equipment (2) according to the relationship:

$$\begin{vmatrix} \vec{g}1 \\ \vec{H}1 \end{vmatrix} = \begin{vmatrix} R1(\alpha, \beta, \Gamma) & 0 \\ 0 & R1(\alpha, \beta, \Gamma) \end{vmatrix} \times \begin{vmatrix} \vec{g}2 \\ \vec{H}2 \end{vmatrix}$$

storing the first rotation operator R1 ($\alpha$, $\beta$, $\Gamma$) in the computer (6); and applying the first operator R1 ($\alpha$, $\beta$, $\Gamma$) to the angle of roll, the angle of pitch attitude and the angle of heading of the equipment (2) to give subsequent measured gravitational data indicative of subsequent values measured by said equipment (2), as well as subsequent measured magnetic data indicative of subsequent values measured by the equipment magnetometer (11).

3. The method as claimed in either of claims 1 or 2 additionally comprising the following steps:

setting the vehicle (1) into non-rectilinear motion;

measuring at various instants and storing in the memory (7) a plurality of values of the components of the magnetic field $\bar{H}2$ sensed by the equipment magnetometer (11) according to the fourth reference system (R4), with differing orientations of the vehicle (1);

calculating a corrective operator, in the computer (6), from said plurality of values of the components of the magnetic field $\bar{H}2$ sensed by the equipment magnetometer (11) and measured in the preceding step to define the corrections to be applied to the components of the various magnetic field vectors $\bar{H}2$ measured in all the preceding steps by the equipment magnetometer (11), in order to correct the hard iron and soft iron magnetic perturbations and the orientation error between the third reference system (R3) of said equipment (2) and the fourth reference system (R4) of said equipment magnetometer (11);

transforming into corrected magnetic field vector components $\bar{H}2c$, by application of said corrective operator, the components of the various magnetic field vectors $\bar{H}2$ measured in all the preceding steps by the equipment magnetometer (11) and replacing, for the subsequent calculations, the components of the corresponding magnetic field vectors $\bar{H}2$;

calculating the error angles $\alpha$, $\beta$, $\Gamma$ to define a second rotation operator R2 ($\alpha$, $\beta$, $\Gamma$) between the second reference system (R2) of said vehicle (1) and the third reference system (R3) of said equipment (2), in the computer (6), from said reference gravitational data, said reference magnetic data, said measured gravitational data, and said measured magnetic data, corresponding to the measurements made on the gruond, and for which the components of the magnetic field vector $\bar{H}2$ representing the magnetic field sensed by said equipment magnetometer (11) are replaced by the components of the corrected magnetic vector $\bar{H}2c$, the angles $\alpha$, $\beta$, $\Gamma$ being solutions of the system of equations:

$$\begin{vmatrix} \vec{g}1 \\ \vec{H}1 \end{vmatrix} = \begin{vmatrix} R2(\alpha, \beta, \Gamma) & 0 \\ 0 & R2(\alpha, \beta, \Gamma) \end{vmatrix} \times \begin{vmatrix} \vec{g}2 \\ \vec{H}2c \end{vmatrix}$$

storing said second rotation operator R2 ($\alpha$, $\beta$, $\Gamma$) in the computer (6); and applying the second rotation operator R2 ($\alpha$, $\beta$, $\Gamma$) to the angle of roll, the angle of pitch attitude and the angle of heading of the equipment (2) determined subsequently from subsequent measurements to give subsequent measured gravitational data indicative of subsequent values measured by said equipment (2), as well as subsequent measured magnetic data indicative of subsequent values measured by the equipment magnetometer (11).

4. The method as claimed in claim 3, wherein said reference gravitational data and said reference magnetic data, on the one hand, said measured gravitational data and said measured magnetic data, on the other hand, corresponding to the measurements made on the ground, are respectively representative of the angles $\Phi 1$, $\theta 1$, $\Omega 1$, on the one hand, and $\Phi 2$, $\theta 2$, $\Omega 2$, on the other hand.

5. The method as claimed in claim 1, applied to a plurality of M (M: positive integer) equipments (2) to be harmonized relative to said vehicle (1), each having first and second rotation operators R1 ($\alpha i$, $\beta i$, $\Gamma i$) and R2 ($\alpha i$, $\beta i$, $\Gamma i$) as well as a characteristic corrective operator (OCi) (with i=1 to M), wherein the plurality of first and second rotation operators R1 ($\alpha i$, $\beta i$, $\Gamma i$), R2 ($\alpha i$, $\beta i$, $\Gamma i$) and of corrective operators (OCi) are determined simultaneously, from measurements made by the various equipments (2) and equipment magnetometers (11) and by a gravity-sensing apparatus (8) and a utility magnetometer (10).

6. The method as claimed in claim 4, wherein there is a single memory (7).

7. The method as claimed in claim 4, wherein there is a single computer (6).

8. The method as claimed in claim 1 additionally comprising the steps of:

measuring on the ground with said equipment (2), said equipment magnetometer (11), said gravity-sensing apparatus (8) and said utility magnetometer (10), data relating to the supplementary ground orientations of the vehicle (1) to supplement the homologous data relating to the initial ground orientation;

transmitting to the computer (6) said data relating to the collection of orientations of the vehicle (1) on the ground and in flight; and calculating a rotation operator R3 ($\alpha$, $\beta$, $\Gamma$) and using said rotation operator R3 ($\alpha$, $\beta$, $\Gamma$), in the computer (6), instead of said second rotation operator R2 ($\alpha$, $\beta$, $\Gamma$), to correct the errors of harmonization of the equipment(s) (2).

9. The method as claimed in either of claims 1 or 2, wherein the accuracy of the gravity-sensing apparatus (8) is higher than the accuracy of the equipment (2).

10. The method as claimed in claim 1, wherein at least the gravity-sensing apparatus (8) or at least one equipment (2) provides data relating to the speed and/or the acceleration of said vehicle (1).

11. A system for harmonizing an equipment means (2) relative to a vehicle (1), said equipment means (2) being installed fixedly on board said vehicle (1) which, relative to a first absolute reference system (RM), has an orientation defined by a second reference system (R2) tied to said vehicle (1), said equipment means (2) being subjected to the earth's gravitational field represented by a gravity vector $\bar{g}$ oriented along its gradient, as well as to the earth's magnetic field represented by a vector $\bar{H}$ oriented along its gradient, and the orientation of said equipment means (2) being defined, relative to said first absolute reference system (RM), by a third reference system (R3), and wherein said vehicle (1) carries measuring means (11), fixed to said vehicle (1), whose orientation, relative to said first absolute reference system (RM), is referenced by a fourth reference system (R4), said system comprising:

a gravity-sensing apparatus comprising means (8) for measuring the values of the components of a vector $\bar{g}1$, representing the earth's gravitational field $\bar{g}$ in the second reference system (R2) and for transforming said values into reference gravitational data indicative of the values measured by the means (8);

means (10) for measuring the values of the components of a vector $\bar{H}1$ representing the earth's magnetic field $\bar{H}$ in the second reference system (R2) and for transforming said values into reference magnetic data indicative of the values measured by the means (10);

a memory comprising means (7) for storing said reference gravitatinal data, indicative of the values measured by the means (8) and said reference magnetic data, indicative of the values measured by the means (10);

equipment means (2) for measuring the values of the components of a vector $\bar{g}2$, representing the earth's gravitational field $\bar{g}$ in the third reference system (R3), and for transforming said values into measured gravitational data indicative of the values measured by the means (2);

an equipment magnetometer comprising means (11) for measuring the values of the components of a vector $\bar{H}2$, representing the earth's magnetic field $\bar{H}$ in the fourth reference system (R4), and for transforming said values into measured magnetic data indicative of the values measured by the means (11);

a computer comprising means (6) for calculating a first rotation operator R1 ($\alpha$, $\beta$, $\Gamma$) from said reference gravitational data, said reference magnetic data, said measured gravitational data, and said measured magnetic data to correct the angular errors of harmonization between the second reference system (R2) of said vehicle (1) and the third reference system (R3) of said equipment (2) according to the relationships:

$$\alpha = \phi 1 - \phi 2$$

$$\beta = \theta 1 - \theta 2$$

$$\Gamma = \Omega 1 - \Omega 2 = 0$$

$\phi 1$, $\theta 1$ and $\Omega 1$ being respectively the angle of roll, the angle of pitch attitude and the angle of heading of the vehicle (1), which are determined from said reference gravitational data and from said reference magnetic data, and $\phi 2$, $\theta 2$, and $\Omega 2$ being respectively the angle of roll, the angle of pitch attitude and the angle of heading of the equipment means (2), which are determined from said measured gravitational data and from said measured magnetic data;

means for applying said first rotation operator R1 ($\alpha$, $\beta$, $\Gamma$) to angles $\phi 2$, $\theta 2$, and $\Omega 2$ determined subsequently from subsequent measurements to give subsequent measured gravitational data indicative of subsequent values measured by said equipment means (2), as well as subsequent measured magnetic data indicative of subsequent values measured by the measuring means (11); and a link connecting said equipment means (2) and said equipment magnetometer to said computer and to said memory.

12. The system as claimed in claim 11, wherein at least the measuring means (8) or the equipment means (2) provides data relating to the speed and/or the acceleration of said vehicle (1).

13. A system for harmonizing an equipment means (2) relative to a vehicle (1), said equipment means (2) being installed fixedly on board said vehicle (1) which, relative to a first absolute reference system (RM), has an orientation defined by a second reference system (R2) tied to said vehicle (1), said equipment means (2) being subjected to the earth's gravitational field represented by a gravity vector $\vec{g}$ oriented along its gradient, as well as to the earth's magnetic field represented by a vector $\vec{H}$ oriented along its gradient, and the orientation of said eqiupment means (2) being defined, relative to said first absolute reference system (RM), by a third reference system (R3) and wherein said vehicle (1) carries measuring means (11), fixed to said vehicle (1), whose orientation, relative to said first absolute reference system (RM), is referenced by a fourth reference system (R4), said system comprising:

- a gravity-sensing apparatus comprising means (8) for measuring the values of the components of a vector $\vec{g}1$, representing the earth's gravitational field $\vec{g}$ in the second reference system (R2) and for transforming said values into reference gravitational data indicative of the values measured by the means (8);
- means (10) for measuring the values of the components of a vector $\vec{H}1$ representing the earth's magnetic field $\vec{H}$ in the second reference system (R2) and for transforming said values into reference magnetic data indicative of the values measured by the means (10);
- a memory comprising means (7) for storing said reference gravitatinal data, indicative of the values measured by the means (8) and said reference magnetic data, indicative of the values measured by the means (10);
- equipment means (2) for measuring the values of the components of a vector $\vec{g}2$, representing the earth's gravitational field $\vec{g}$ in the third reference system (R3), and for transforming said values into measured gravitational data indicative of the values measured by the means (2);
- an equipment magnetometer comprising means (11) for measuring the values of the components of a vector $\vec{H}2$, representing the earth's magnetic field $\vec{H}$ in the fourth reference system (R4), and for transforming said values into measured magnetic data indicative of the values measured by the means (11);
- a computer comprising means (6) for calculating a first rotation operator R1 ($\alpha$, $\beta$, $\Gamma$) from said reference gravitational data, said reference magnetic data, said measured gravitational data, and said measured magnetic data to correct the angular errors of harmonization between the second reference system (R2) of said vehicle (1) and the third reference system (R3) of said equipment (2) according to the relationship:

$$\begin{vmatrix} \vec{g}1 \\ \vec{H}1 \end{vmatrix} = \begin{vmatrix} R1(\alpha, \beta, \Gamma) & 0 \\ 0 & R1(\alpha, \beta, \Gamma) \end{vmatrix} \times \begin{vmatrix} \vec{g}2 \\ \vec{H}2 \end{vmatrix}$$

means for applying said first rotation operator R1 ($\alpha$, $\beta$, $\Gamma$) to the angle of roll, the angle of pitch attitude and the angle of heading of the equipment means (2) determined subsequently from subsequent measurements to give subsequent measured gravitational data indicative of subsequent values measured by said equipment means (2), as well as subsequent measured magnetic data indicative of subsequent values measured by the measuring means (11); and a link connecting said equipment means (2) and said equipment magnetometer to said computer and to said memory.

* * * * *

UNITED STATES PATENT AND TRADEMARK OFFICE
CERTIFICATE OF CORRECTION

PATENT NO. : 5,321,631

DATED : June 14, 1994

INVENTOR(S) : Serge A. Germanetti

It is certified that error appears in the above-indentified patent and that said Letters Patent is hereby corrected as shown below:

Column 1, line 46, "and harmonized," should be --and harmonized.--

Column 2, line 68, "reference system" should be --reference system RM;--

Column 11, line 44, "presu/ning" should be --presuming--

Column 11, line 64, before "a relationship in",
  insert --with R = R ($\Phi$1, $\theta$1, $\Omega$1) x R1 ($\alpha$, $\beta$, $\Gamma$)--

Column 13, line 44, "$\vec{H}ac$" should be --$\vec{H}2c$--

Column 17, line 50, "gravitatinal" should be --gravitational--

Column 17, line 64, "the first operator" should be --the first rotation operator--

Column 18, line 43, "gruond" should be --ground--

UNITED STATES PATENT AND TRADEMARK OFFICE
CERTIFICATE OF CORRECTION

PATENT NO. : 5,321,631

DATED : June 14, 1994

INVENTOR(S) : Serge A. Germanetti

It is certified that error appears in the above-indentified patent and that said Letters Patent is hereby corrected as shown below:

Column 20, line 10 "gravitatinal" should be --gravitational--

Column 21, line 11, "eqiupment" should be --equipment--

Column 21, line 32, "gravitatinal" should be --gravitational--

Signed and Sealed this

Thirteenth Day of September, 1994

Attest:

BRUCE LEHMAN

*Attesting Officer*          *Commissioner of Patents and Trademarks*